United States Patent
Ishidoshiro

(10) Patent No.: US 7,515,555 B2
(45) Date of Patent: Apr. 7, 2009

(54) WIRELESS LAN TRANSCEIVER AND WIRELESS LAN TRANSMITTING/RECEIVING METHOD

(75) Inventor: Takashi Ishidoshiro, Nagoya (JP)

(73) Assignee: Buffalo Inc., Nagoya-shi, Aichi-ken (JP)

( * ) Notice: Subject to any disclaimer, the term of this patent is extended or adjusted under 35 U.S.C. 154(b) by 348 days.

(21) Appl. No.: 10/999,550

(22) Filed: Nov. 30, 2004

(65) Prior Publication Data
US 2005/0152315 A1 Jul. 14, 2005

(30) Foreign Application Priority Data
Dec. 4, 2003 (JP) .............................. 2003-405596

(51) Int. Cl.
*H04Q 7/00* (2006.01)

(52) U.S. Cl. ................... 370/310; 375/219; 375/267; 375/347; 455/78; 455/562.1; 455/67.11; 455/67.13; 455/446; 455/450; 455/451; 455/452.2; 455/453

(58) Field of Classification Search ............... 370/310; 375/219, 267, 347; 455/78, 562.1, 67.13, 455/446, 450–453, 67.3
See application file for complete search history.

(56) References Cited

U.S. PATENT DOCUMENTS

| | | | |
|---|---|---|---|
| 6,018,555 A * | 1/2000 | Mahany ..................... | 375/347 |
| 6,542,736 B1 * | 4/2003 | Parkvall et al. ............ | 455/452.2 |
| 2002/0048317 A1 * | 4/2002 | Boer et al. .................. | 375/219 |
| 2002/0058488 A1 * | 5/2002 | Miyahara .................. | 455/277.2 |
| 2003/0153358 A1 * | 8/2003 | Moon et al. ................ | 455/561 |
| 2004/0147289 A1 * | 7/2004 | Paljug et al. .............. | 455/562.1 |
| 2005/0075081 A1 * | 4/2005 | Catreux-Erceg et al. .... | 455/78 |
| 2005/0078763 A1 * | 4/2005 | Choi et al. ................. | 375/267 |
| 2005/0113041 A1 * | 5/2005 | Polley et al. ............... | 455/105 |

FOREIGN PATENT DOCUMENTS

EP          0544337 A        6/1993

(Continued)

OTHER PUBLICATIONS

Newton's Telecon Dictionary—Harry Newton, ISDN # 1-57820-053-9, Feb. 2000, p. 860.*

(Continued)

*Primary Examiner*—Rafael Pérez-Gutiérrez
*Assistant Examiner*—Nimesh Patel
(74) *Attorney, Agent, or Firm*—Yokoi & Co., U.S.A. Inc.; Peter Ganjian

(57) ABSTRACT

The present invention addresses a problem that switching antennas along with an unexpected variation of a received electrical field strength brings about a loss over a long period of data transmission. According to a wireless LAN transceiver in which the present invention is implemented, when a data throughput attained by an application layer poses no problem, switching antennas is disabled. Consequently, the data throughput can be kept satisfactory. Namely, since whether the antennas are switched is not determined with an unexpected variation of an RSSI signal or an error rate in a lower layer, unnecessary switching of the antennas can be prevented. A loss derived from the switching of the antennas can be minimized over a long period of time.

10 Claims, 7 Drawing Sheets

FOREIGN PATENT DOCUMENTS

| | | |
|---|---|---|
| EP | 0837522 A | 4/1998 |
| EP | 1453224 A | 9/2004 |
| JP | 04-119029 | 4/1992 |
| JP | 06-315022 | 11/1994 |
| JP | 07-245601 | 9/1995 |
| JP | 10-190341 | 7/1998 |
| JP | 2004-297312 | 10/2004 |
| JP | 2005-005803 | 1/2005 |
| WO | WO03/028272 A | 4/2003 |

OTHER PUBLICATIONS

International Search Report dated Mar. 15, 2005.
PCT Written Opinion of the International Searching Authority dated Mar. 15, 2005.
Korean Office Action dated Apr. 23, 2007.
Taiwan Notification of Examination and Argument, dated May 15, 2008.
The supplementary European search report, under Article 153(7) EPC dated Oct. 30, 2008, searched on Oct. 10, 2008.

* cited by examiner

WIRELESS LAN TRANSCEIVER AND WIRELESS LAN TRANSMITTING/RECEIVING METHOD

BACKGROUND OF THE INVENTION

1. Field of the Invention

The present invention relates to a wireless LAN transceiver and a wireless LAN transmitting/receiving method. More particularly, the present invention is concerned with a wireless LAN transceiver including a plurality of antennas and a wireless LAN transmitting/receiving method.

2. Description of the Related Art

In a known conventional wireless LAN transceiver, when a received signal strength indication (RSSI) signal proportional to an electrical field strength received by an antenna or an error rate in demodulated data to be transferred to a medium access control (MAC) unit is degraded, antennas to be connected to a receiving circuit are switched.

Owing to the above configuration, an antenna keeping the received electrical field strength or error rate satisfactory is used to thus ensure a successful data link.

In the foregoing conventional wireless LAN transceiver, a cycle required for the received electrical field strength or error rate to vary is often much shorter than an actual data transmission period. A substantially average transmission speed a user perceives is not always high enough. In other words, when antennas are switched along with an unexpected variation of the received electrical field strength, it may bring about a loss occurring over a long data transmission period.

SUMMARY OF THE INVENTION

Accordingly, an object of the present invention is to provide a wireless LAN transceiver and a wireless LAN transmitting/receiving method capable of ensuring a satisfactory data throughput.

In order to accomplish the above object, the present invention provides a wireless LAN transceiver comprising a plurality of antennas and an antenna selector for selecting any of the plurality of antennas and connecting the selected antenna to a receiving circuit. The antenna selector detects a data throughput. When the data throughput is degraded, the antennas to be connected to the receiving circuit are switched.

In the present invention having the foregoing components, the antenna selector switches the antennas to be connected to the receiving circuit. The antenna selector includes a section for detecting a data throughput. When the data throughput is degraded, the antennas to be connected to the receiving circuit are switched. Namely, an antenna keeping the data throughput satisfactory can be connected to the receiving circuit. Herein, the data throughput refers to a so-called effective transfer rate or an amount of data transmitted per unit time. Otherwise, the data throughput may depend on the format of transferred data so as to signify the number of jobs to be executed per unit time or the number of messages to be handled per unit time.

Thus, a wireless LAN transceiver capable of ensuring a satisfactory data throughput can be provided.

According to another aspect of the present invention, the antenna selector detects an electrical field strength received by an antenna. When the received electrical field strength is degraded, the antennas to be connected to the receiving circuit are switched. Even when the received electrical field strength is degraded, as long as the data throughput remains satisfactory, the antennas to be connected to the receiving circuit are not switched.

In this case, the antenna selector includes a section for detecting a received electrical field strength. When the detected received electrical field strength is degraded, the antennas to be connected to the receiving circuit are switched. However, as long as the data throughput is satisfactory, even if the received electrical field strength is degraded, switching the antennas to be connected to the receiving circuit is not performed. Namely, the antennas to be connected to the receiving circuit are switched based on both the received electrical field strength and the data throughput. A satisfactory data throughput is ensured as a top priority.

Consequently, a satisfactory data throughput can be ensured irrespective of an unexpected change in a received electrical field strength.

Moreover, according to another aspect of the present invention, the antenna selector records in advance the variation pattern of the data throughput suggesting that the antennas to be connected to the receiving circuit should be switched. The antenna selector compares a detected variation of the data throughput with the recorded variation pattern. If the detected variation resembles the recorded variation pattern, the antennas to be connected to the receiving circuit are switched.

In this case, the antenna selector records the variation pattern of the data throughput, which suggests that the antennas should be switched, as a switching pattern. The antenna selector compares an actually detected variation pattern of the data throughput with the switching pattern. When the variation pattern recorded as the switching pattern resembles the actually detected variation pattern of the data throughput, switching the antennas to be connected to the receiving circuit is performed.

Consequently, a satisfactory data throughput can be ensured irrespective of an unexpected variation of a data throughput.

Furthermore, according to another aspect of the present invention, the data throughput is a data throughput attained by an application layer.

In this case, the antennas to be connected to the receiving circuit are switched based on the data throughput attained by the application layer.

Consequently, a data throughput a user perceives can be kept satisfactory.

According to still another aspect of the present invention, the data throughput is a data throughput of live data.

Namely, a data throughput of live data can be kept satisfactory.

Consequently, a data throughput of data to be actually transmitted or received can be kept satisfactory.

As mentioned above, a section for switching antennas according to a data throughput is not always limited to a device that is an entity but may be implemented as a method. In a wireless LAN transmitting/receiving method requiring a plurality of antennas and an antenna selector for selecting any of the plurality of antennas and connecting the selected antenna to a receiving circuit, a data throughput may be detected. When the data throughput is degraded, the antennas to be connected to the receiving circuit may be switched.

Namely, the present invention is not limited to a device that is an entity but may be effectively provided as a method to be implemented in the device.

Other and further objects, features and advantages of the invention will appear more fully from the following description.

DESCRIPTION OF THE PREFERRED EMBODIMENTS

(1) First Embodiment

Figure 1:
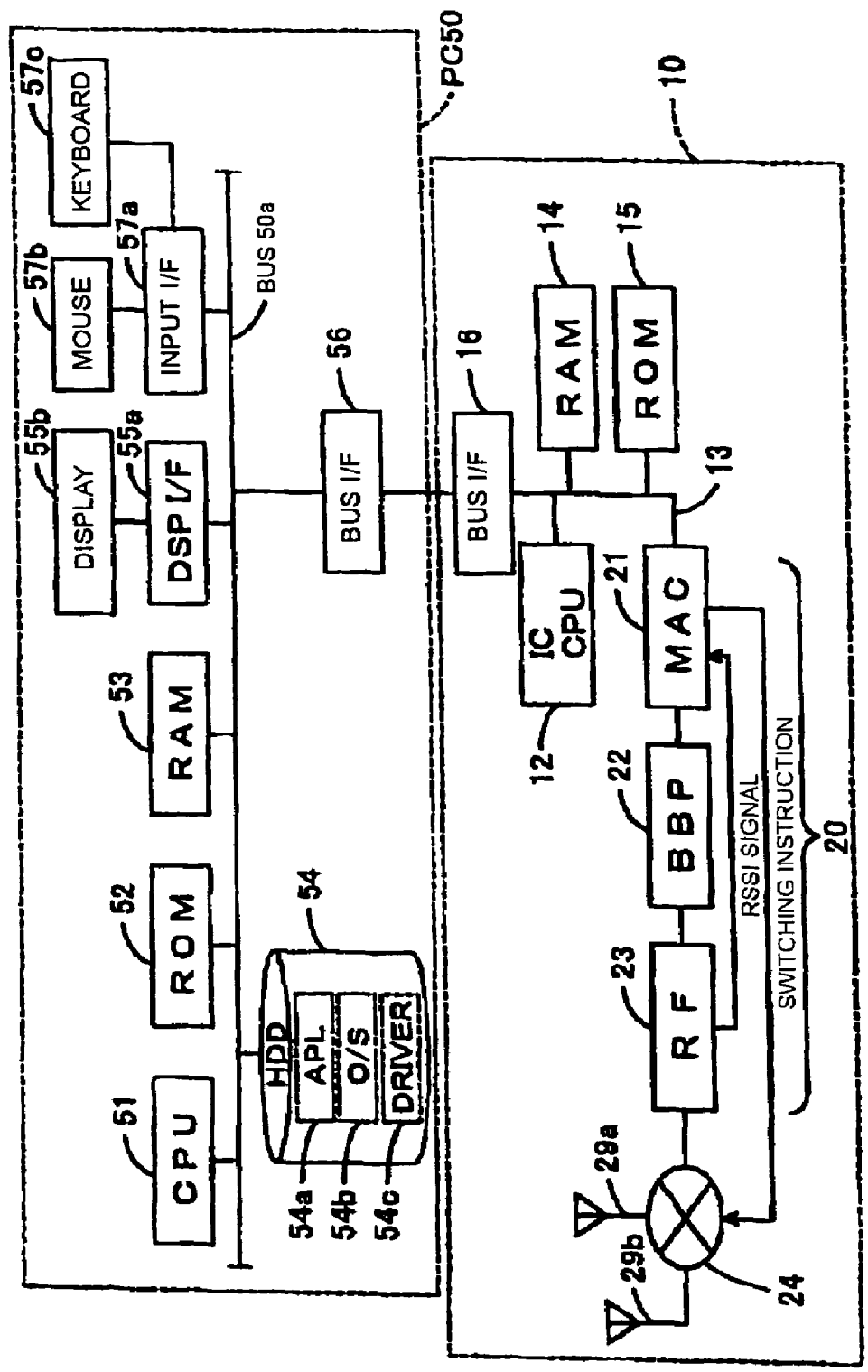
FIG. 1 schematically shows a hardware configuration of a system comprising a LAN adapter card and a personal computer.

FIG. 1 is block diagram schematically showing the hardware configurations of a wireless LAN adapter card that realizes a wireless LAN, and of a personal computer connected to the wireless LAN adapter card, wherein the wireless LAN adapter card and personal computer are included in the first embodiment of the present invention. An object to which the present invention is applied is not limited to the combination of the wireless LAN adapter card and personal computer but may be a wireless LAN access point or the like or a router, a hub, or a terminal adapter in which a wireless LAN communications feature is incorporated. Referring to FIG. 1, a wireless LAN adapter card (hereinafter a wireless LAN adapter) 10 includes a CPU 12 that controls the wireless LAN adapter 10 on a centralized basis. The CPU 12 is connected on an internal bus 13. A RAM 14 and a ROM 15 are interconnected over the internal bus 13. Based on firmware and data stored in the ROM 15, the CPU 12 executes predetermined arithmetic and logic operations while using a storage area in the RAM 14.

A physical layer circuit 20 is connected on the bus 13. The physical layer circuit 20 comprises a medium access control (MAC) circuit 21, a baseband processor (BBP) 22, a radio circuit (RF) 23, a switching circuit 24, and a pair of antennas 29a and 29b. The MAC circuit 21 controls access to a medium and is connected to the radio circuit 23 with the baseband processor 22 between them. The radio circuit 23 realizes transmission of digital data within a predetermined frequency band. The switching circuit 24 switches the antennas 29a and 29b, which are connected to the switching circuit 24, in response to a switching instruction sent from the MAC circuit 21. The radio circuit 23 detects a dc voltage, which is proportional to an electrical field strength received by the connected antenna 29a or 29b, as a received signal strength indicator (RSSI) signal. The detected RSSI signal is transmitted to the MAC circuit 21. When the level of the RSSI signal drops and a predetermined condition is met, the MAC circuit 21 transmits a switching instruction, which instructs switching of the antennas 29a and 29b, to the switching circuit 24.

A bus interface (IF) 16 is connected on the internal bus 13, and the internal bus 13 can be joined to a bus, on which peripheral equipment is connected, via the bus interface 16. In the present embodiment, as an example of the peripheral equipment, a personal computer (hereinafter, PC) 50 is connected to the LAN adapter 10 via a bus interface 56. In the PC 50, a CPU 51, a ROM 52, a RAM 53, a CRT interface 55a, an input interface 57a, a bus interface 56, and a hard disk drive (HDD) 54 are interconnected over a bus 50a. A mouse 57b and a keyboard 57c are also interconnected via the input interface 57a. Application programs 54a, an operating system (OS) 54b, and various drivers 54c are stored in the hard disk drive 54.

(2) Software Configuration of the PC

Figure 2:
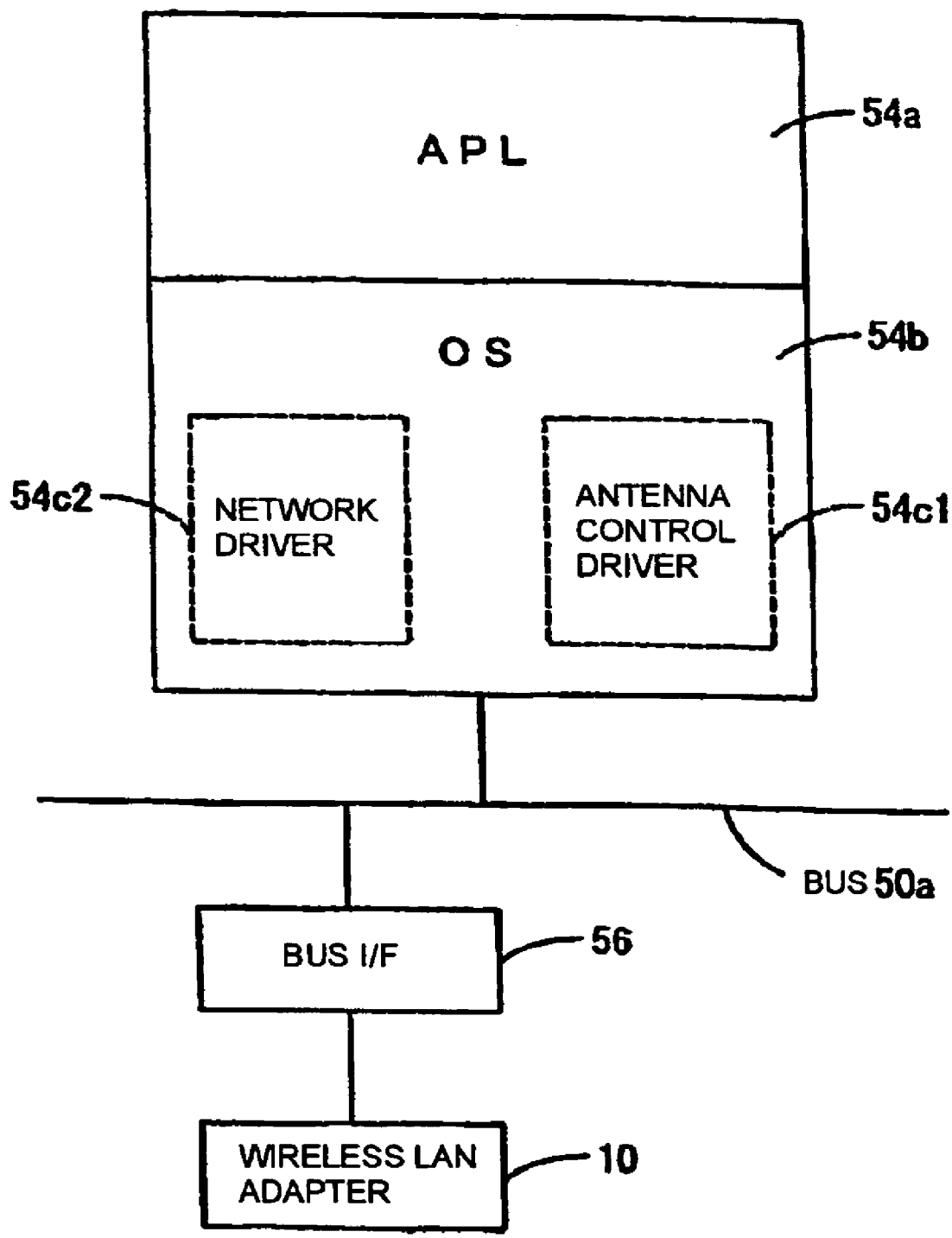
FIG. 2 schematically shows a software configuration of a personal computer.

FIG. 2 schematically shows the configuration of software to be run in the PC 50. The OS 54b is installed in the PC 50. The OS 54b is fundamental software and provides basic services, which include development of files and display of screen images, in common for the application programs 54a. The application programs 54a are pieces of software for realizing such purposes as file transfer, e-mail, text processing, and spreadsheet. The application programs 54a are installed in the PC 50 together with the OS 54b. When any of the application programs 54a is run, it is read into the RAM 53. The CPU 51 executes arithmetic and logic operations according to the application program 54a. At this time, the CPU 51 also executes arithmetic and logic operations according to the OS 54b so as to thus provide the basic services, or manages resources to be used by the application program 54a.

The drivers 54c1 and 54c2 are pieces of software incorporated in the OS 54b and serve as a translator between the OS 52 or application programs 54a and various hardware devices. Consequently, the OS 52 and application programs 54a use the drivers 54c1 or 54c2 to drive or control various hardware devices. The driver 54c2 is a device driver for driving the entire LAN adapter 10, while the driver 54c1 is a device driver for driving the antennas 29a and 29b and switching circuit 24 included in the LAN adapter 10. The drivers incorporated in the OS 54b are not limited to the above ones but drivers for driving or controlling the CPU 51, bus 50a, mouse 57b, or keyboard 57c are also incorporated in the OS 54b. Control signals to be sent from the drivers 54c1 and 54c2 to the LAN adapter 10 are transmitted to the hardware devices included in the LAN adapter 10 via the bus interface 56.

(3) Constituent Features

Figure 3:
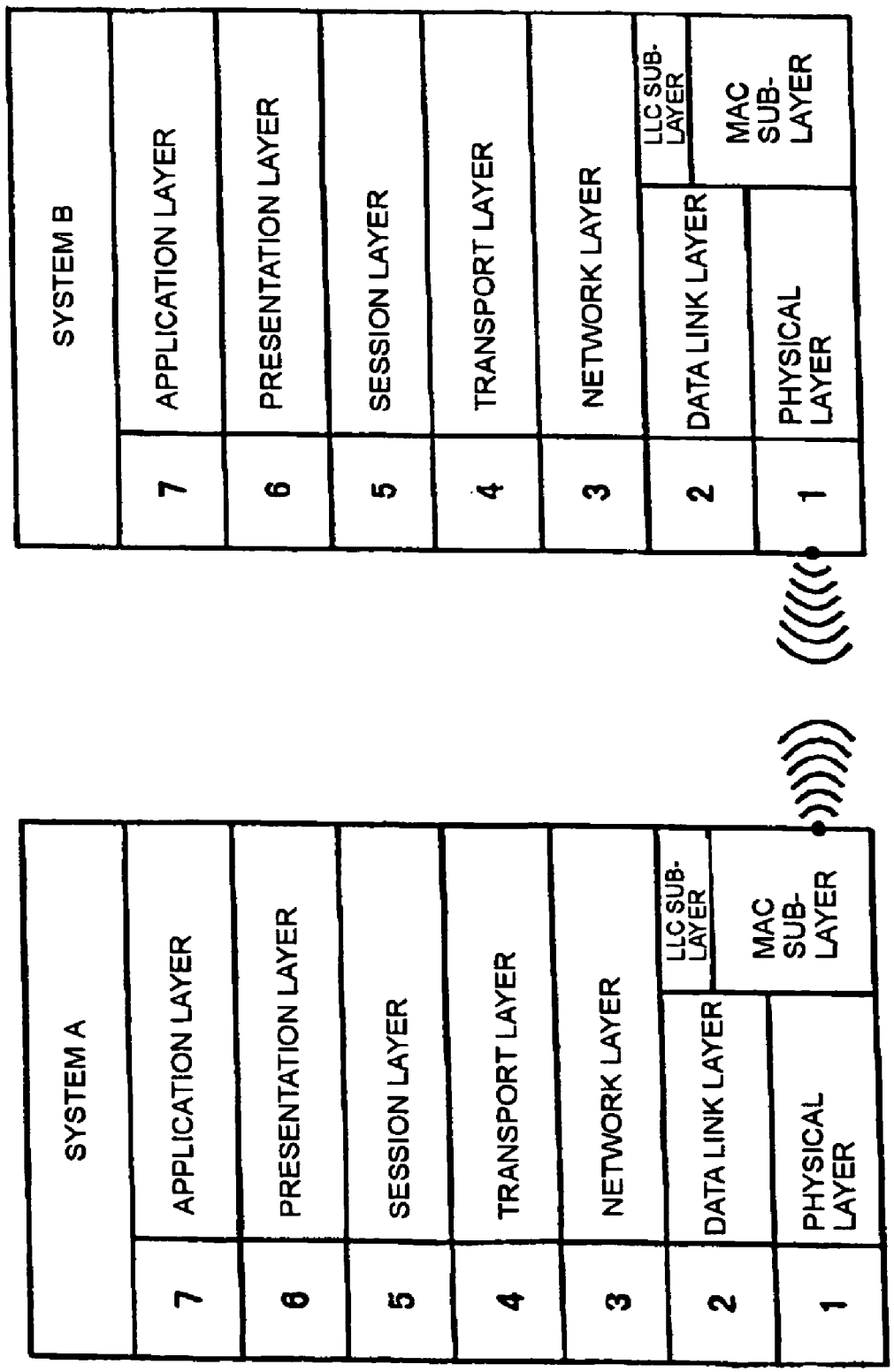
FIG. 3 shows a network architecture for a system.

The hardware configurations and software configurations of the PC 50 and wireless LAN adapter 10 respectively have been described so far. If the hardware devices and software programs work in cooperation with one another to implement predetermined features, the PC 50 and wireless LAN adapter 10 can appropriately perform wireless LAN communications. FIG. 3 conceptually shows the structure of features required for wireless LAN communications. The structure of features is referred to as a network architecture. A standard model representing a standardized network architecture is being produced for the purpose of generalization of system resources. FIG. 3 shows an open systems interconnection (OSI) reference model as an example of the standard model. Referring to FIG. 3, the OSI reference model is hierarchically structured to have the first to seventh layers. The respective layers realize predetermined features.

The first layer that is the lowermost layer and a physical layer converts a packet, which is sent from an upper-level layer, into an electrical signal represented by a bit stream or the like, or converts the electrical signal into a packet and transfers the packet to the upper-level layer. Moreover, the first layer is physically connected to an external system such as a computer and fills the role of transferring the electrical signal to or from the system. For the physical connection to the external system, the rules for communication must be standardized in order to permit communication between systems. What defines the rules is a protocol. In the case of a wireless LAN to which the present invention is adapted, the protocol defines the frequency band for radio waves to be transferred to or from the antennas 29a and 29b and the modulation form therefore. The protocol is not limited to the physical layer but is defined for the second to seventh layers. Even dissimilar systems can communicate with each other over a wireless LAN.

The second layer that is a data link layer detects or corrects a communication error. In the case of a wireless LAN to which the present invention is adapted, processing to be performed by the physical layer or data link layer is often ruled by protocols defined by the IEEE 802.11b standard. Moreover, the protocols for wireless LAN communications defined by the IEEE 802.11b standard are vaguely distinguished into the protocol for the physical layer and the protocol for the data link layer. Instead, the protocols for wireless LAN communications defined by the IEEE 802.11b standard are often distinguished into the protocol for a MAC sub-layer that controls access to a medium and the protocol for a logical link control (LLC) sub-layer that serves as a translator between the MAC sub-layer and an upper layer. Processing to be performed by the physical layer or data link layer is initiated when the physical layer circuit 20 or the CPU 12 runs firmware stored in the ROM 15. Each system should merely observe specified protocols, but which of systems is performing what processing does not count.

The third layer that is a network layer deals mainly with routing (path control) or with packet sequencing. To be more specific, a header signifying routing information or sequencing information is appended to a packet received from an upper layer, and the packet is then transferred to a lower layer. Otherwise, the header signifying routing information or sequencing information is separated from a packet received from a lower layer, read and transferred to an upper layer. The fourth and subsequent layers will be generally described because they are not limited to wireless LAN communications.

The fourth layer that is a transport layer establishes, sustains, or releases a connection. Moreover, when a packet is transferred from the network layer to the transport layer, the packet is joined with the separated information in order to produce integral data. In contrast, when data is transferred from the transport layer to the network layer, the data is divided into a packet and other information.

The fifth layer that is a session layer manages or controls synchronous information concerning data. Consequently, different kinds of data items such as audio information, motion picture information, and text information are synchronized with one another and then reproduced.

The sixth layer that is a presentation layer expresses a data format and converts one data format into another data format according to which data can be transferred over a network.

The seventh layer that is an application layer runs various kinds of applications that provide such services as e-mail, file transfer, and spreadsheet.

Figure 4:
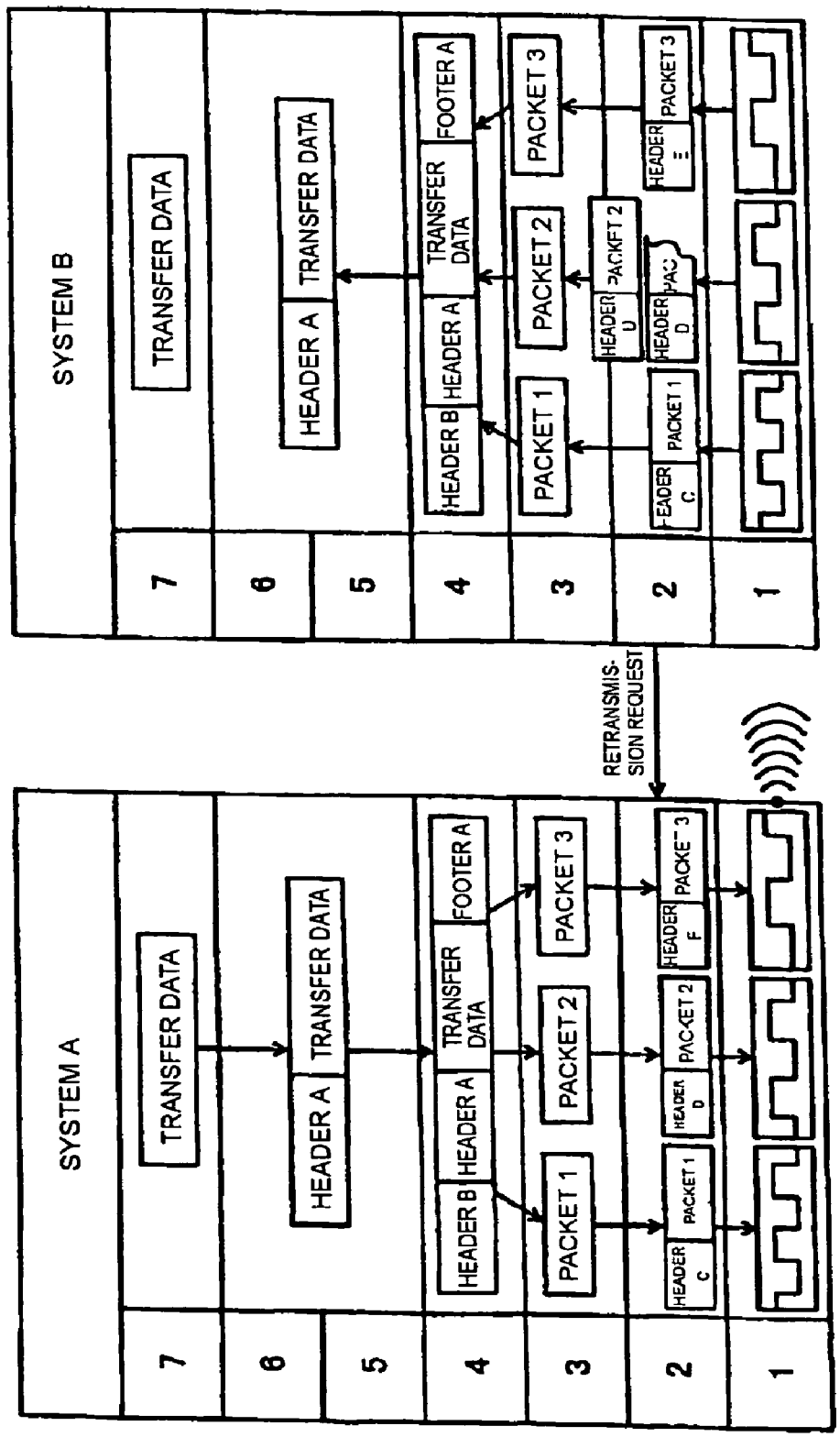
FIG. 4 illustratively shows a flow of data transmission and reception.

FIG. 4 illustratively shows a flow of pieces of processing to be performed in respective layers of hierarchical structures of systems that transmit or receive data to or from either of them. Referring to FIG. 4, system A is a data transmitting side, and system B is a data receiving side. Herein, a description will be made of a case where, in response to a request made by a file transfer application installed in system B, system A transfers a file to system B. To begin with, the seventh layer of system A transfers transfer data, which is equivalent to a file to be transferred, to the sixth layer thereof. The transfer data is sequentially transferred from the sixth layer to lower layers ending with the fourth layer. Moreover, a required header and footer are appended to the transfer data. The header and footer are data items assisting the corresponding layers of system B in receiving data appropriately. For example, the header and footer are data items representing information such as an address, a sending person, an error checking code, or a required storage capacity.

Transfer data to which the headers or footers are appended is transferred to the lower layer that is the third layer, and divided into a plurality of packets. Since data is divided into small size of packets, the transmission line linking systems A and B is prevented from being occupied by the data for a prolonged period of time. Retransmission for error recovery can be achieved in small units. Consequently, communication can be achieved efficiently. The packets are transferred to the second layer and each appended a required header or the like. The header contains data required for joining the packets orderly to restore original data. The packets with the headers appended thereto are transferred to the first layer and converted into an electrical signal. The electrical signal is carried by a radio wave and then received by the first layer of system B.

The processing flow in system A that is a transmitting side has been described so far. In system B, reception basically opposite to transmission performed by system A is carried out. Namely, the first layer converts a received electrical signal into packets, and the second layer acquires information such as pieces of information represented by headers from the packets and separates the headers from the packets. Moreover, the second layer detects an error rate at which an error occurs in the packets. A request for retransmission of an erroneous packet is issued to the second layer of system A. While the erroneous packet is recovered, the packets are transferred to the upper layer that is the third layer. The third layer produces transfer data, which has the headers appended thereto, on the basis of the pieces of information acquired from the headers of the packets. Furthermore, the transfer data has the headers separated therefrom while being transferred to the upper layer. The seventh layer restores data which the seventh layer of system A has transmitted.

As mentioned above, data (packets) to be transferred to or from lower layers contains headers and footers. The amount of data does not agree with an amount of live data transmitted or received from or to the seventh application layer. Furthermore, the lower layers may retransmit data (packet) for the purpose of error recovery. Consequently, the amount of data to be transferred to the lower layers disagrees with the amount of live data to be transmitted or received to or from the application layer. Furthermore, the lower layers deal with data in units of a packet. The lower layers can sense the transmitted state of a packet but cannot sense a data throughput of live data to be transmitted or received to or from the application layer. Namely, the application layer transfers very long data and assesses the data throughput to be attained over a long period of time. In contrast, the lower layers can grasp only the transmitted state of a packet attained over a short period corresponding to the transmission time of the packet.

What poses a problem is switching of the antennas 29a and 29b the switching circuit 24 performs in response to a switching instruction sent from the MAC circuit 21. The switching itself is executed by the MAC sub-layer or the physical layer. Normally, the antennas 29a and 29b to be connected to the radio circuit 23 are switched based on a variation of an RSSI signal proportional to an electrical field strength received by the antenna 29a or 29b or a change in an error rate of packets to be transferred to or from the MAC sub-layer or physical layer. However, as mentioned above, the transmitted state of a packet attained in the lower layers does not always show the same tendency as the data throughput of live data to be transmitted or received to or from the application layer.

Moreover, when the MAC circuit 21 switches the antennas 29a and 29b to be connected to the radio circuit 23 according to a variation of an RSSI signal or a change in an error rate which is assessed at intervals of a short period, the data throughput attained by the upper layers may decrease to cause a loss. Namely, the switching of the antennas 29a and 29b causes the loss. From the viewpoint of a long period at intervals of which the data throughput attained by the upper layers is assessed, when the antennas 29a and 29b are not switched, the loss may be small. The period at intervals of which the data throughput attained by the application layer is assessed is recognized by a user as a period from the instant any of the application programs 54a initiates reception to the instant it completes the reception. Moreover, a certain application program 54 to be run may notify the user of the data throughput as a transfer rate. Namely, what the user assesses is the data throughput attained by the application layer. It is therefore important to keep the data throughput satisfactory.

(4) Switching the Antennas

In efforts to solve the foregoing problems, the present embodiment switches the antennas as described below.

Figure 5:
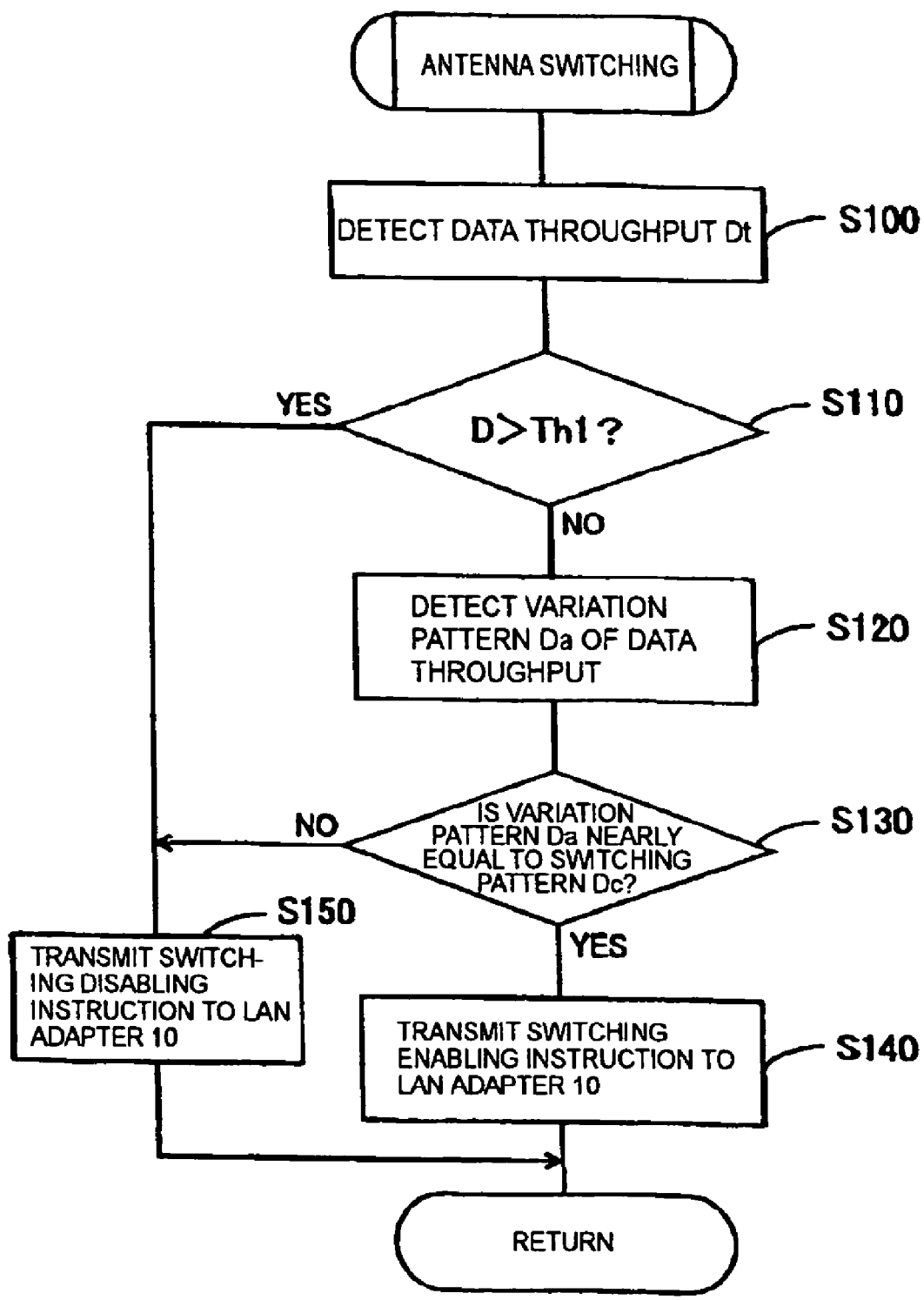
FIG. 5 is a flowchart describing antenna switching.
Figure 6:
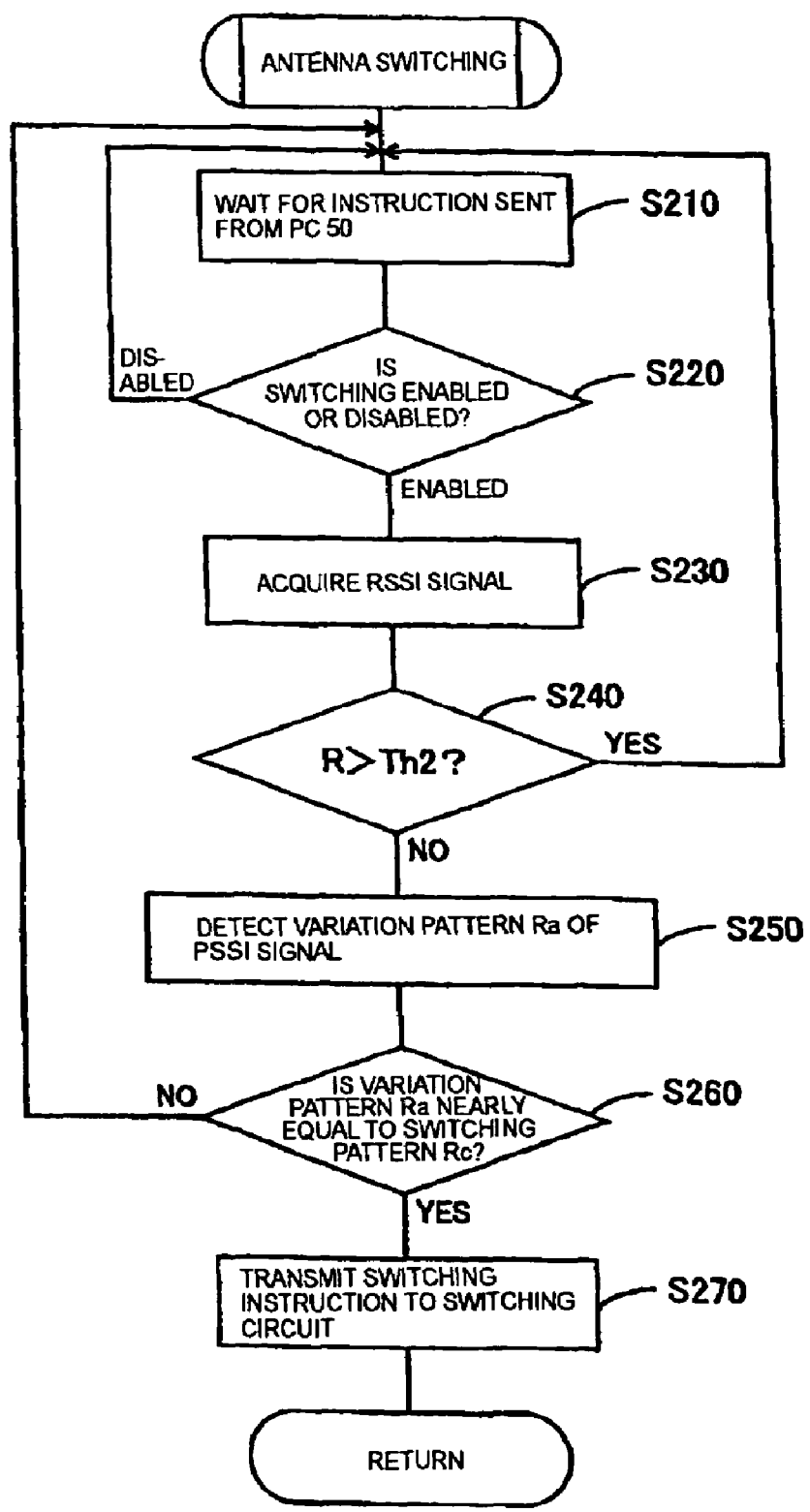
FIG. 6 is a flowchart describing antenna switching.

FIG. 5 is a flowchart describing a flow of antenna switching performed by the PC 50. Moreover, FIG. 6 is a flowchart describing a flow of antenna switching to be performed by the LAN adapter 10. Referring to FIG. 5, first, at step S100, a data throughput Dt of data received by the application layer is detected. For example, when e-mail software is run as one of the application programs 54a, the application program 54a detects the data throughput Dt of received mails or attachments of the received mails.

At step S110, the detected data throughput Dt is compared with the lower limit Th1 of data throughput values. If the data throughput Dt is larger than the lower limit TH1, an antenna switching disabling instruction is transmitted to the LAN adapter 10 at step S150. Namely, if the data throughput Dt is larger than the lower limit Th1 of data throughput values, the received state poses no problem, and the antennas 29a and 29b to be connected to the receiving circuit 23 are not switched. On the other hand, if the data throughput Dt is smaller than the lower limit Th1, a variation pattern Da expressing a variation of the data throughput D1 is detected. Incidentally, the data throughput Dt refers to an average amount of data transmitted per unit time, and the variation pattern Da of the data throughput Dt signifies a variation of the data throughput Dt over a plurality of unit times. For example, assuming that the data throughput Dt refers to an average amount of data transmitted per unit time of 1 sec, a period during which the variation Da of the data throughput Dt is detected is 20 sec or 30 sec. The period is not limited to 20 sec or 30 sec.

Figure 7:
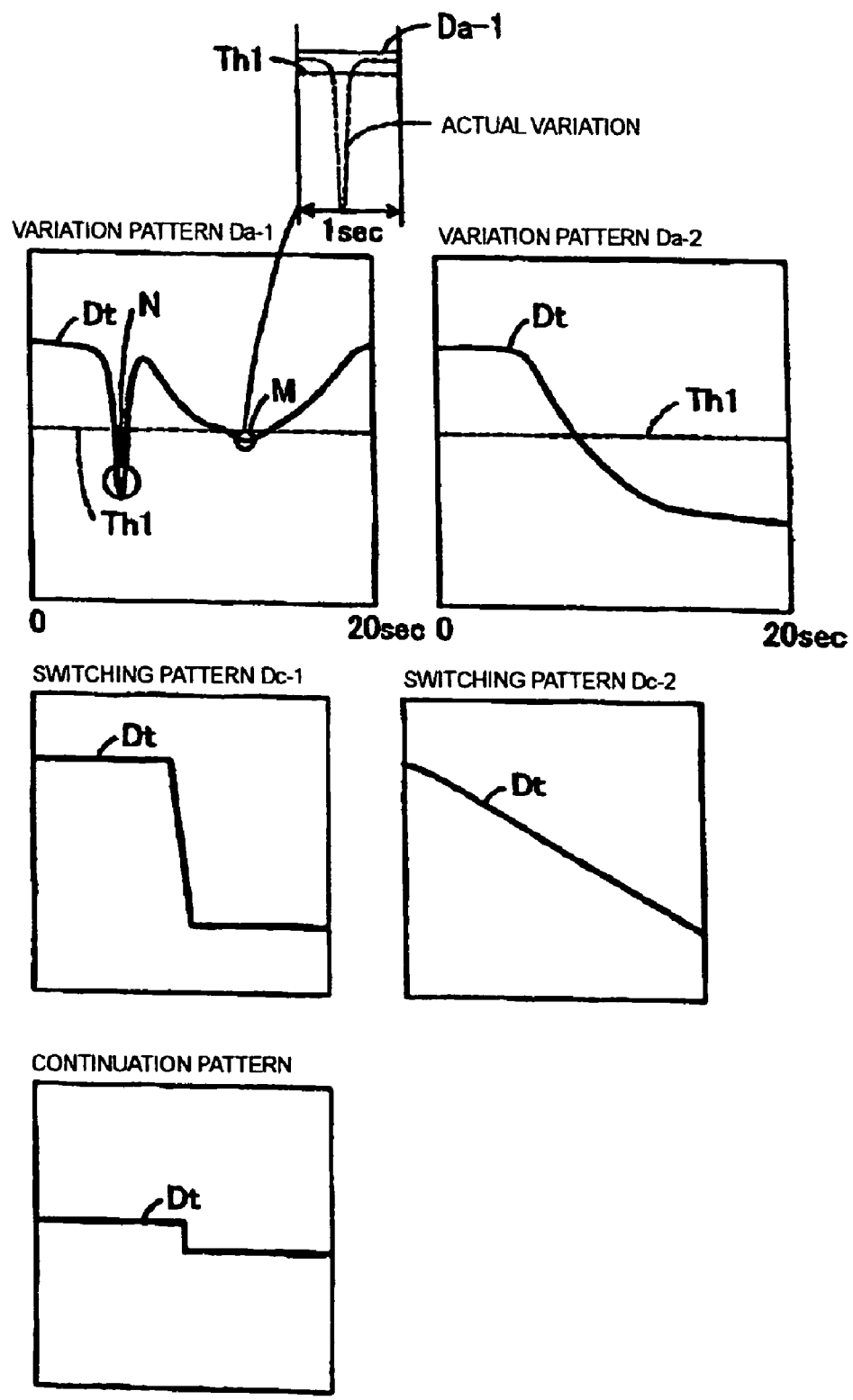
FIG. 7 includes graphs expressing variation patterns and switching patterns.

The upper part of FIG. 7 graphically shows examples of the variation pattern Da of the data throughput Dt detected at step S120. The lower part of FIG. 7 graphically shows an example of a switching pattern Dc. At step S130, the resemblance between the variation pattern Da and switching pattern Dc is verified. Only when the patterns resemble each other, a switching enabling instruction is transmitted to the LAN adapter 10 at step S140. Switching patterns Dc-1 and Dc-2 shown in the lower part of FIG. 7 indicate a large decrease in the data throughput Dt and are regarded as variation patterns signifying that the data throughput Dt is unrecoverable.

Consequently, if the variation pattern is verified to resemble the switching pattern Dc-1 or Dc-2 at step S130, the data throughput Dt is degraded and thought to be unrecoverable. An antenna switching enabling instruction is then transmitted to the LAN adapter 10 at step S140. In contrast, if the variation pattern Da is verified to resemble neither the switching pattern Dc-1 nor Dc-2, the data throughput Dt is thought to be satisfactory. An antenna switching disabling instruction is then transmitted to the LAN adapter 10 at step S150. In the examples shown in FIG. 7, the variation pattern Da-2 resembles the switching pattern Dc-1. When a variation pattern is checked at step S130 to see if it resembles any switching pattern, a predetermined permissible range may be defined relative to the curve expressing the switching pattern Dc, and whether the variation pattern Da makes a transition within the permissible range may be verified. Moreover, the resemblance in a characteristic value indicating a maximum value, a minimum value, or a slope between the variation pattern Da and switching pattern Dc may be checked to see if the patterns are similar to each other.

Consequently, only when the data throughput Dt is degraded over a long period of time and thought to be unrecoverable, an antenna switching enabling instruction is transmitted to the LAN adapter 10. Namely, for example, when the data throughput Dt is degraded over a specific time zone alone in the same manner as it is degraded at a point N in the graph of the variation pattern Da-1, recovery of the data throughput Dt may be waited without the necessity of switching the antennas 29a and 29b. Furthermore, as mentioned above, the data throughput Dt refers to an average amount of data transmitted per unit time. Even when an amount of transmitted data rapidly decreases in practice, since the amounts of transmitted data detected at intervals of one second are averaged, the amount of transmitted data that is a high-frequency component whose throughput is low can be removed as it is at point M in the graph of the variation pattern Da-1. Namely, whether a received state remains satisfactory over a long period of time can be verified irrespective of, for example, an unexpected decrease in an electrical field strength received by the antenna 29a or 29b or whether a packet is recovered from an error. Incidentally, the switching pattern is stored in advance in the HDD 54 and read whenever it is required.

As described above, the PC 50 transmits either an antenna switching enabling instruction or an antenna switching disabling instruction to the LAN adapter 10. At step S210 in FIG. 6, a standby state continues until either of the instructions is transferred from the PC 50. At step S220, whether the antenna switching enabling instruction or disabling instruction is transferred is verified. If the switching disabling instruction is transferred, control is returned to step S210, and an instruction sent from the PC 50 is waited for. Namely, when the switching disabling instruction is transferred, subsequent antenna switching is not executed but the standby state is sustained until the next instruction is transferred.

On the other hand, if the switching enabling instruction is transferred, an RSSI signal Rt proportional to a received electrical field strength is acquired at step S230. At step S240, the RSSI signal Rt proportional to the electrical field strength received by the antenna 29a or 29b is compared with the lower limit Th2 of RSSI signal levels. If the RSSI signal Rt is higher than the lower limit Th2, the received electrical field strength poses no problem. Control is then returned to step S210, and an instruction sent from the PC 50 is waited for. If the RSSI signal Rt is lower than the lower limit Th2, the received electrical field strength poses a problem. At step S250, the variation pattern Ra of the RSSI signal R is detected. At step S260, the variation pattern Ra of the RSSI signal Rt is compared with the switching pattern Rc predefined for the RSSI signal Rt.

The switching pattern Rc for the RSSI signal Rt is stored in advance in the HDD 54 or ROM 15 and is nearly identical to the switching pattern Dc predefined for the data throughput Dt. Namely, a variation pattern signifying that the RSSI signal Rt is thought to be unrecoverable over a predetermined period of variation is stored in advance. Consequently, when the variation pattern Ra of the RSSI signal Rt resembles the switching pattern Rc and the RSSI signal Rt is thought to be unrecoverable, the antennas 29a and 29b to be connected to the switching circuit 24 are switched at step S270. In the present embodiment, whether the antennas 29a and 29b are switched is verified based on the RSSI signal Rt. Alternatively, whether the antennas are switched may be verified based on an error rate of packets transferred to the MAC circuit 23. Otherwise, whether the antennas are switched may be verified based on both the RSSI signal and error rate.

(5) Summary

As described so far, according to a wireless LAN transceiver in which the present invention is implemented, when the data throughput Dt attained by the application layer poses no problem, switching the antennas 29a and 29b is disabled. Consequently, the data throughput Dt can be kept satisfactory. In other words, whether the antennas 29a and 29b are switched is not determined with an unexpected variation of an RSSI signal Rt or an error rate occurring in a lower layer. Consequently, unnecessary switching of the antennas 29a and 29b can be prevented. A loss derived from switching of the antennas 29a and 29b can be minimized over a long period of time.

The foregoing invention has been described in terms of preferred embodiments. However, those skilled in the art will recognize that many variations of such embodiments exist. Such variations are intended to be within the scope of the present invention and the appended claims.

What is claimed is:

1. A wireless local area network (LAN) system, comprising:
    a wireless LAN transceiver having a plurality of antennas;
    a periphery device coupled with the wireless LAN transceiver;
    the periphery device detecting a data throughput Dt of data received from the wireless LAN transceiver, with the data throughput Dt being the average amount of data transceived per unit of time by an application layer;
    if the detected data throughput Dt is greater than a lower limit data throughput value Th1, the periphery device transmits an antenna switching disabling instruction to the wireless LAN transceiver;
    if the detected data throughput Dt is less than the lower limit data throughput value Th1, the periphery device detects a variation pattern Da of data throughput Dt, which is a variation of the data throughput Dt over a plurality of unit times, and compares the variation pattern Da with one or more switching patterns Dc;
    if the variation pattern Da is not substantially equal to the one or more switching patterns Dc, the periphery device transmits the antenna switching disabling instruction to the wireless LAN transceiver to maintain current antenna coupling;
    if the variation pattern Da is substantially equal to the one or more switching patterns Dc, the periphery device transmits an antenna switching enabling instruction to the wireless LAN transceiver, thereby providing the switching enabling instruction only when the data throughput Dt is degraded over a long period of time and unrecoverable; and
    the wireless LAN transceiver detects the antenna switching enabling instruction transmitted from the periphery device based on the data throughput Dt;
    if the antenna switching enabling instruction is received from the periphery device, the wireless LAN transceiver acquires a Received Signal Strength Indication (RSSI) signal Rt, which proportional to an electrical field strength received by a coupled antenna of the plurality of antennas; and
    the wireless LAN transceiver determines if the acquired RSSI signal Rt is greater than a lower limit of RSSI signal level Th2;
    if the RSSI signal Rt greater than the lower limit of RSSI signal level Th2, the received electrical signal strength from the coupled antenna is satisfactory;
    if the RSSI singal Rt is less than the lower limit of RSSI signal level Th2, the wireless LAN transceiver detects a variation pattern Ra of RSSI signal Rt;
    if the variation pattern Ra of the RSSI signal Rt is substantially equal to a predefined switching pattern Rc, the wireless LAN transceiver transmits switching instructions to a switching circuit to switch connection from the coupled antenna to another one of the plurality of antennas.

2. The wireless local area network (LAN) system according to claim 1, wherein:
    an antenna selector detects the electrical field strength received by the coupled antenna;
    when the received electrical field strength is degraded, the antenna selector switches from the coupled antenna to another one of the plurality of antennas to be connected to the a wireless local area network (LAN) transceiver; and
    even when the received electrical field strength is degraded, as long as the data throughput Dt remains satisfactory, the antenna selector does not switch the antennas to be connected to the a wireless local area network (LAN) transceiver.

3. The wireless local area network (LAN) system according to claim 1, wherein:
    an antenna selector records in advance the variation pattern Da of the data throughput Dt, which signifies that the antennas to be connected to the receiving circuit should be switched, as the switching pattern Dc, and compares the switching pattern Dc with a detected variation pattern Da of the data throughput Dt; and
    if the switching pattern Dc and detected variation pattern Da resemble each other, the antenna selector switches the antennas to be connected to a wireless local area network (LAN) transceiver circuit.

4. The wireless local area network (LAN) system according to claim 1, wherein the data throughput Dt is a data throughput attained by the application layer.

5. The wireless local area network (LAN) system according to claim 1, wherein the data throughput Dt is a data throughput of live data.

6. A wireless local area network (LAN) system, comprising:
    a wireless LAN transceiver having a plurality of antennas;
    a periphery device coupled with the wireless LAN transceiver;
    the periphery device detecting a data throughput Dt of data received from the wireless LAN transceiver, with the data throughput Dt being the average amount of data transceived per unit of time by an application layer;
    if the detected data throughput Dt is greater than a lower limit data throughput value Th1, the periphery device transmits an antenna switching disabling instruction to the wireless LAN transceiver;

if the detected data throughput Dt is less than the lower limit data throughput value Th1, the periphery device detects a variation pattern Da of data throughput Dt, which is a variation of the data throughput Dt over a plurality of unit times, and compares the variation pattern Da with one or more switching patterns Dc;

if the variation pattern Da is not substantially equal to the one or more switching patterns Dc, the periphery device transmits the antenna switching disabling instruction to the wireless LAN transceiver to maintain current antenna coupling;

if the variation pattern Da is substantially equal to the one or more switching patterns Dc, the periphery device transmits an antenna switching enabling instruction to the wireless LAN transceiver, thereby providing the switching enabling instruction only when the data throughput Dt is degraded over a long period of time and unrecoverable.

7. A wireless local area network (LAN) system, comprising:

a wireless LAN transceiver having a plurality of antennas;

a periphery device coupled with the wireless LAN transceiver;

the wireless LAN transceiver detects an antenna switching enabling instruction transmitted from the periphery device based on a data throughput Dt, with the data throughput Dt being the average amount of data transceived per unit of time by an application layer;

if the antenna switching enabling instruction is received from the periphery device, the wireless LAN transceiver acquires a Received Signal Strength Indication (RSSI) signal Rt, which is proportional to an electrical field strength received by a coupled antenna of the plurality of antennas; and the wireless LAN transceiver determines if the acquired RSSI signal Rt is greater than a lower limit of RSSI signal level Th2;

if the RSSI signal Rt is greater than the lower limit of RSSI signal level Th2, the received electrical signal strength from the coupled antenna is satisfactory;

if the RSSI signal Rt is less than the lower limit of RSSI signal level Th2, the wireless LAN transceiver detects a variation pattern Ra of RSSI signal Rt;

if the variation pattern Ra of the RSSI signal Rt is substantially equal to a predefined switching pattern Rc, the wireless LAN transceiver transmits switching instructions to a switching circuit to switch connection from the coupled antenna to another one of the plurality of antennas.

8. A method for switching antennas for wireless local area network (LAN) system, comprising:

detecting a data thoughput Dt of data received from a wireless LAN transceiver, with the data throughput Dt being the average amount of data transceived per unit of time by an application layer;

transmitting an antenna switching disabling instruction to the wireless LAN transceiver if the detected data throughput Dt is greater than a lower limit data throughput value Th1;

detecting a variation pattern Da of data throughput Dt, which is a variation of the data throughput Dt over a plurality of unit times, and comparing the variation pattern Da with one or more switching pattern Dc if the detected data throughput Dt is less than the lower limit data throughput value Th1;

transmitting the antenna switching disabling instruction to the wireless LAN transceiver to maintain current antenna coupling if the variation pattern Da is not substantially equal to the one or more switching patterns Dc;

transmitting an antenna switching enabling instruction to the wireless LAN transceiver, thereby providing the switching enabling instruction only when the data throughput Dr is degraded over a long period of time and unrecoverable if the variation pattern Da is substantially equal to the one or more switching pattern Dc.

9. A method for switching antennas for wireless local area network (LAN) system, comparing:

detecting an antenna switching enabling instruction transmitted from a periphery device based on a data throughput Dt, with the data throughput Dt being the average amount of data transceived per unit of time by an application layer;

acquiring a Received Signal Strength Indication (RSSI) signal Rt, which is proportional to an electrical field strength received by a coupled antenna of the plurality of antennas if the antenna switching enabling instruction is received from the periphery device; and determining if the acquired RSSI signal Rt is greater than a lower limit of RSSI signal level Th2;

if the RSSI signal Rt is greater than the lower limit of RSSI level Th2, the received electrical signal strength from the coupled atenna is satisfactory;

detecting a variation pattern Ra of RSSI signal Rt if the RSSI signal Rt is less than the lower limit of RSSI signal level Th2, and transmitting switching instruction to a switching circuit to switch connection from the coupled antenna to another one of the plurality of antennas if the variation pattern Ra of the RSSI signal Rt is substantially equal to a predefined switching pattern Rc.

10. A method for switching antenna for wireless local area network (LAN) system, comprising:

detecting a data throughput Dt of data received from a wireless LAN transceiver, with the data throughput Dt being the average amount of data transceived per unit of time by an application layer;

transmitting an antenna switching disabling instruction to the wireless LAN transceiver if the detected data throughput Dt is greater than a lower limit data throughput value Th1;

detecting a variation pattern Da of data throughput Dt, which is a variation of the data throughput Dt over a plurality of unit times, and comparing the variation pattern Da with one or more switching patterns Dc if the detected data throughputDt is less Than the lower limit data throughput value Th1;

transmitting the antenna switching disabling instruction to the wireless LAN transceiver to maintain current antenna coupling if the variation pattern Da is not substantially equal to the one or more switching patterns Dc;

transmitting an antenna switching enabling instruction to the wireless LAN transceiver, thereby providing the switching enabling instruction only when the data throughput Dt is degraded over a long period of time and recoverable if the variation pattern Da is substantially equal to the one or more switching pattern Dc; and detecting the antenna switching enabling instruction transmitted from a periphery device based on the data throughput Dt;

acquiring a Received Signal Strength Indication (RSSI) signal Rt, which is proportional to an electrical field strength received by a coupled antenna of the plurality of antennas if the antenna switching enabling instruction is received from the periphery device; and determining if the acquired RSSI signal Rt is greater than a lower limit of RSSI signal level Th2;

if the RSSI signal Rt is greater than the lower limit of RSSI signal level Th2, the received electrical signal strength from the coupled antenna is satisfactory;

detecting a variation pattern Ra of RSSI signal Rt if the RSSI signal Rt is less than the lower limit of RSSI signal level Th2; and transmitting switching instructions to a switching circuit to switch connection from the coupled antenna to another one of the plurality of antennas if the variation pattern Ra of the RSSI signal Rt is substantially equal to a predefined switching pattern Rc.

* * * * *